United States Patent [19]

Takayama et al.

[11] Patent Number: 5,473,375
[45] Date of Patent: Dec. 5, 1995

[54] ELECTRONIC STILL VIDEO CAMERA WHEREIN A PRE-EXPOSURE PERIOD IS UTILIZED TO GENERATE CONTROL SIGNALS OF INTEGRTED VALUES OF THE PHOTOELECTRICALLY CONVERTED IMAGE SIGNAL TO CONTROL BOTH EXPOSURE AND COLOR BALANCE

[75] Inventors: Tsutomu Takayama, Kawasaki; Shigeo Yamagata, Yokohama; Yasuyuki Yamazaki, Ohmiya, all of Japan

[73] Assignee: Canon Kabushiki Kaisha, Tokyo, Japan

[21] Appl. No.: 316,829

[22] Filed: Oct. 3, 1994

Related U.S. Application Data

[63] Continuation of Ser. No. 740,892, Aug. 6, 1991, abandoned.

[30] Foreign Application Priority Data

| Aug. 8, 1990 | [JP] | Japan | 2-208245 |
| Aug. 9, 1990 | [JP] | Japan | 2-209199 |
| Jul. 31, 1991 | [JP] | Japan | 3-192031 |

[51] Int. Cl.⁶ .............................. H04N 9/73; H04N 9/64
[52] U.S. Cl. .................. 348/364; 348/224; 348/225; 348/227; 348/228
[58] Field of Search .............. 358/909.1; 348/223, 348/224, 225, 227, 228, 364; H04N 9/73, 7/73 C, 9/64

[56] References Cited

U.S. PATENT DOCUMENTS

| 4,274,107 | 6/1981 | Tamura et al. | 358/29 |
| 4,638,350 | 1/1987 | Kato et al. | 358/29 C |
| 4,679,066 | 7/1987 | Masunaga et al. | 358/29 |
| 4,689,686 | 8/1987 | Hashimoto et al. | 358/213.19 |
| 4,727,413 | 2/1988 | Miura et al. | 358/29 |
| 4,774,564 | 9/1988 | Konishi | 358/29 |
| 4,797,733 | 1/1989 | Takagi et al. | 358/29 |
| 4,811,086 | 3/1989 | Hieda | 358/29 C |
| 4,827,332 | 5/1989 | Miyake et al. | 358/29 |
| 4,847,680 | 7/1989 | Okino | 358/29 |
| 4,879,591 | 11/1989 | Takai | 358/29 C |
| 4,918,519 | 1/1990 | Suzuki et al. | 358/29 C |
| 4,998,162 | 3/1991 | Kondo et al. | 358/41 |
| 5,001,552 | 3/1991 | Dkino | 358/29 |
| 5,021,874 | 6/1991 | Tsugita | 358/29 |
| 5,036,400 | 7/1991 | Haruki | 348/364 |
| 5,065,232 | 11/1991 | Kondo | 358/29 C |
| 5,065,247 | 11/1991 | Haruki | 358/228 |
| 5,260,774 | 11/1993 | Takayama | 358/29 |

FOREIGN PATENT DOCUMENTS

| 1227581 | 7/1989 | Japan. | |
| 2016854 | 9/1979 | United Kingdom | H04N 9/535 |

*Primary Examiner*—Victor R. Kostak
*Assistant Examiner*—John W. Miller
*Attorney, Agent, or Firm*—Fitzpatrick, Cella, Harper & Scinto

[57] ABSTRACT

An electronic still video camera wherein a pre-exposure period is utilized to generate control signals to control both exposure and color balance includes a photoelectric converter for producing an electrical signal corresponding to a received image. Exposure structure is provided for exposing the converter to the image, the amount of radiation admitted by the exposure structure being controllable. Color adjusting circuitry is provided for electrically altering the balance of different colors in the picture to be taken. Control circuitry is provided for controlling the exposure structure to provide a first exposure, and for deriving, from the output of the photoelectric converter corresponding to the first exposure, integrated values which are used to correct both an exposure period and the color balance in a subsequent picture-taking second exposure.

25 Claims, 9 Drawing Sheets

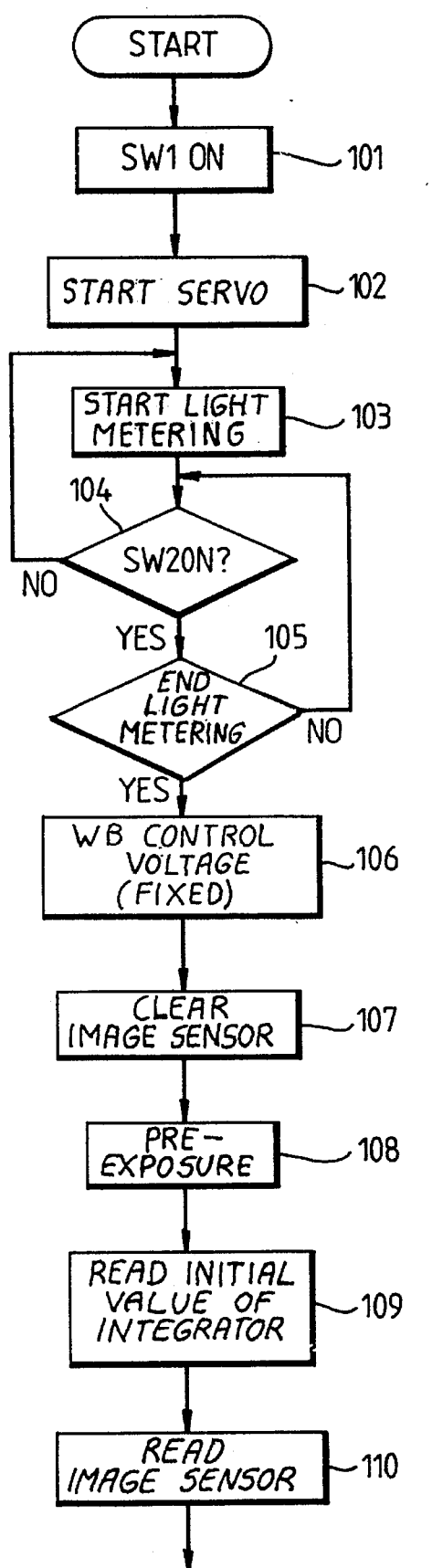
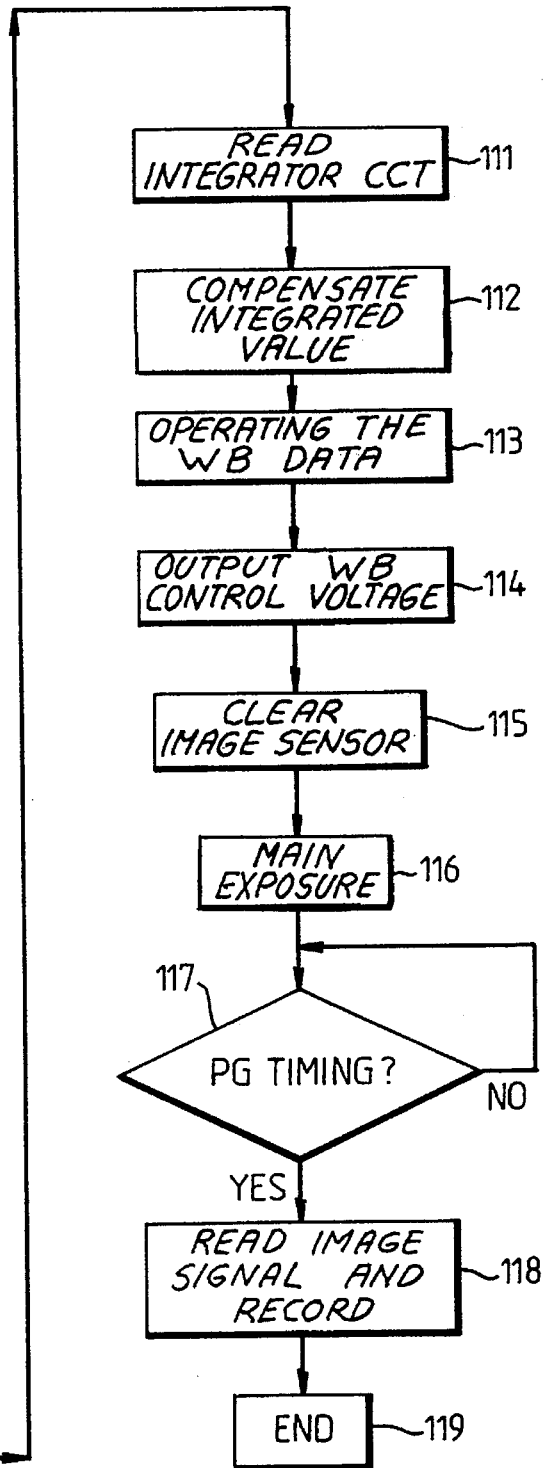
Fig. 7.

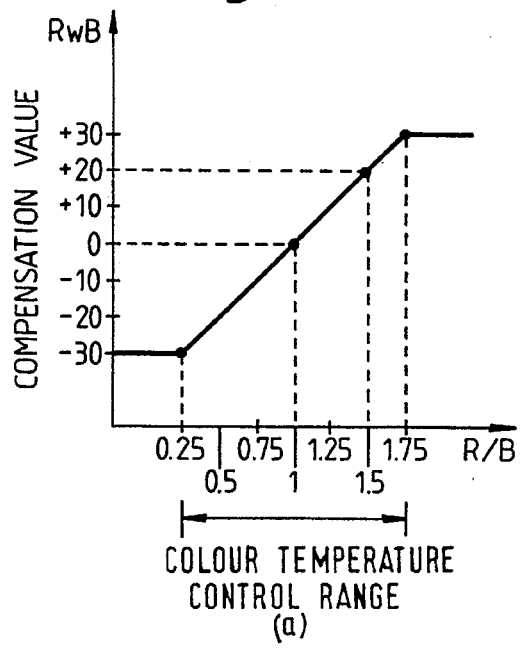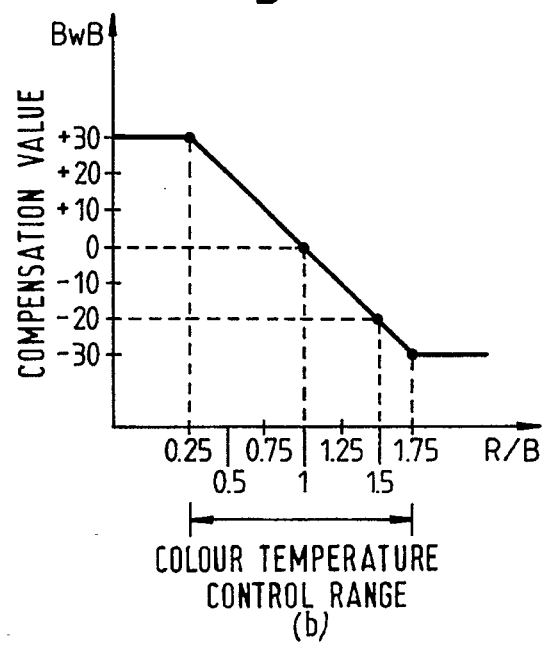

ELECTRONIC STILL VIDEO CAMERA WHEREIN A PRE-EXPOSURE PERIOD IS UTILIZED TO GENERATE CONTROL SIGNALS OF INTEGRTED VALUES OF THE PHOTOELECTRICALLY CONVERTED IMAGE SIGNAL TO CONTROL BOTH EXPOSURE AND COLOR BALANCE

This application is a continuation of application Ser. No. 07/740,892 filed Aug. 6, 1991, now abandoned.

FIELD OF THE INVENTION

This invention relates to an electronic camera, particularly an electronic still video camera.

BACKGROUND ART

It is known to provide an electronic still video camera; that is, apparatus which electrically stores signals representing a still image. The stored image may then be read and displayed, for example, on a conventional television or monitor. Conveniently, therefore, the signals are provided in a suitable television image format; the stored signals may, for example, comprise luminance and color difference signals modulated on to a high frequency carrier and recorded on a magnetic or magneto-optical record carrier such as disk.

One example of such a camera is shown in U.S. Pat. No. 4,956,715, granted to the same assignee as the present invention.

In a conventional (non-electronic) camera, the silver halide film has a wide dynamic range; in other words, if the exposure provided by the shutter and iris settings is too low, it is generally possible to retrieve an acceptable image by increasing the development time. However, by comparison, the dynamic range of an electronic camera tends to be much smaller so that if the iris and shutter settings are too large or too small during exposure of the electronic image sensor which provides the electronic video signal, the image formed will be entirely overexposed or entirely underexposed (all white or all black), or almost so.

Manipulating the gain of the electronic signal produced by the sensor (equivalent to controlling the development time of the conventional film) can restore the average level of the electronic signal, but cannot restore the image contrast which has been lost due to the incorrect exposure. It is therefore important in electronic cameras to provide the correct exposure for the image sensor.

With moving image video cameras, it is known to provide a feedback loop to continuously control the iris setting in dependence upon previous sensor outputs. However, this is not possible with a still video camera because the camera is not operative before a given video picture is taken, so continuous control is not possible.

Accordingly, the present assignee has developed a technique for exposure control for an electronic still video camera. As described in U.S. Pat. No. 4,956,715, a photosensitive element is provided which has a relatively wide dynamic range, compared to the image sensor, which receives a light level corresponding to that receivable by the image sensor and provides an electrical output signal indicating the light level. This output is used to control the iris setting and/or the shutter speed (it may, for example, be desirable to allow the user to control the iris and accordingly to control only the shutter speed, or vice versa) to provide an approximate exposure setting.

However, the approximate exposure setting is not sufficiently accurate to be directly usable, due to the different responses to the light of the photometric sensor and the image sensor. Accordingly, a second exposure control process is also performed in which, when a picture is to be taken, the image sensor is first exposed to light and its output over the image area is measured. The output is then employed to set the shutter and/or iris, and the picture is taken by re-exposing the image sensor to light for the thus-derived exposure period, and storing the image sensor output (in a suitable format).

A further problem which occurs with cameras of all kinds for taking color pictures is that of the color of illuminating light. Illumination sources such as sunlight, light bulbs, or neon sources produce light colors and color distributions which vary widely. Many light sources act approximately like black body radiators, and it is therefore conventional to describe their color and distribution in terms of a color temperature. The human eye is extremely tolerant to variations in color temperature, and will tend to treat a white object as white whatever the illuminating color. However, the human eye quickly recognizes a color cast in a picture.

Accordingly, it is very desirable in a color camera to provide a color balancing circuit, which is arranged to derive an indication of the color of the illumination and to process the picture signal to compensate accordingly. For example, if the illumination were read, the color video signal would be processed to reduce the amount of red present therein, to restore the color balance. Since information on the illumination is not generally available to the camera, the illumination color is inferred by deriving the average color of the scene.

In a moving picture video camera, it is possible to keep a moving temporal average of previous output of the image sensor (over a window of about 2–10 seconds) to provide an approximate indication of the average scene color and hence color temperature. However, with a still camera this is not possible because as noted above the camera is generally not operative except when a picture is being taken.

One method employed in the prior art is to provide a separate color temperature detecting circuit, which comprises typically three photosensors each disposed under a respective color filter (for example a red filter, a green filter and a blue filter), positioned behind an optical diffuser (for example a frosted glass element) so that they receive light from substantially the whole scene. The outputs of the three sensors indicate the relative magnitudes of three different colors in the scene, and the amount by which they deviate from a predetermined ratio is employed to correct the color balance of the output of the image sensor. Typically, the image sensor provides a separated color or color difference video signals, and the amplitude of these signals is controlled by a controllable gain element in dependence upon the color temperature measuring sensor outputs.

However, in practice the color balance control provided by this method is found not to be ideal. Firstly, the color filters provided in the color sensor may not correspond exactly to those provided on the image sensor. Secondly, the color response characteristics of the image sensor are typically very different to those of the color measuring sensor. Thirdly, providing a separate sensor is expensive.

Prior proposals for eliminating the separate sensor are known. Such proposals instead use the output of the image sensor to derive a measure of the color balance. However, there are some problems with such proposals. One problem is that, whereas the color measuring sensor in the prior art was arranged to receive a wide view through a diffuser plate, the image sensor receives a view through the focussing lenses of the camera and may therefore receive a view which corresponds to a close up of a particular object. If this object is substantially monochrome, for example, all red or all blue, the output of the image sensor will correspondingly be predominantly monochrome and there is a danger that this will be assumed to correspond to colored light rather than a colored object, leading to an opposite color balance correction which would (incorrectly) render the object which and all other objects incorrect. In a video camera, this problem is overcome by integrating or averaging the output of the photosensor over a relatively long period of time (seconds or minutes). Since the camera will not usually point at a single object for a very long period of time, the color balancing information is derived corresponding to a number of objects of picture areas and correspondingly does not depend upon a monochrome object. However, this is not possible with a still camera for obvious reasons.

EP-A-0207543 describes an electronic video camera including a frame transfer type image sensor and having a white balance control circuit which is controlled from the image sensor output during a frame blanking period in which the light to the sensor is passed through a light diffuser comprising a plate of frosted glass inserted temporarily in front of the sensor. This broadens the field of view of the sensor and reduces the dependence on monochrome subjects. Adjustment of the white balance occurs between successive picture taking intervals of a moving picture sequence.

However, insertion and removal of the diffuser element is time consuming and involves intricate and expensive electro mechanical actuators. In addition, it can reduce the time for forming the pre-exposed image, which is already relatively short compared with the time for forming the image itself.

EP-A-0394018 (invented by the present inventor and assigned to the present applicant), forming part of the state of the art by virtue of Art 54(3) only, describes, in a first embodiment (FIG. 1) a camera in which a frame of an image is captured by the image sensor, and the image sensor output is stored in an image memory and also used to calculate color balance direction data. The image information stored in the memory is then read out and corrected in accordance with the color balance correction data. The color balance correction is calculated by averaging color information over the captured frame and consequently the image memory is necessary to provide a one frame delay while the color balance correction data is being calculated. In some applications, however, the expense of a further image memory (which must, of course, have a substantial size), together with its associated analogue-to-digital and digital-to-analogue conversion means, is not acceptable. Further, such a device increases the power usage (and reduces the battery lifetime) of the camera, and increases the size of the electronic circuit.

In a second embodiment (FIG. 5) of EP-A-0394018, the memory is omitted. The color balance data is instead derived by initially exposing the image sensor to the scene; optically obtaining wide-scene information by de-focussing, zooming or using a frosted defocussing plate so as to reduce the depence on monochrome objects; deriving color representative signals and then integrating the signals over the frame to provide color balance control signals.

SUMMARY OF THE INVENTION

An object of the invention is to provide an improved color balance circuit in an electronic camera.

A further object is to overcome the above problems, either individually or in combination.

In one aspect, the present invention provides an electronic still video camera in which the image sensor is exposed for a first period and its output is used to control both the exposure time and the color balance of a picture derived from the image sensor output in a second exposure period.

In another aspect, the invention provides a camera comprising control means arranged to control a camera operating parameter (for example, color balance or exposure) in which the control means comprise integration means for integrating an output from the image sensor over a predetermined period and differencing means for generating a signal responsive to the difference between the output of the integrator and a correction value.

In one embodiment the correction value is representative of the integrator output level prior to integration, so as to correct for drift in the integrator.

In a second embodiment, the correction value is representative of the output of the image sensor in the absence of light thereon, so as to correct for the dark current for other errors caused by the image sensor. In this embodiment, the correction value may be derived by a step of integrating the output of the image sensor whilst it is shielded from light; since this step may be performed just before the integration for parameter control, the correction value is not greatly affected by variations in the electronic circuit response due to, for example, drift of components values or changes of temperature.

The correction value may in either case be derived at each picture-taking operation, or may be derived once and retained for a predetermined period, or until the camera is next switched off.

In a further aspect, the invention provides an electronic video camera including input means for receiving an input indicating a particular anticipated color balance, and color balance means for forming a color balance control signal responsive to the difference between a sensed color balance and said anticipated color balance, and for modifying the camera output in dependence thereon. This allows the user of the camera to set a predetermined expected color temperature, such as "sunlight" or "floodlight", and simplifies and reduces the task to be performed by the color balance control means.

In a further aspect, the invention provides an electronic still picture video camera comprising an image sensor and means for affecting the color balance of the sensor output signals, further comprising means for deriving the setting of the affecting means, in which the means for deriving are responsive to a signal corresponding to the output of the image sensor affected by the affecting means during a measuring period. Furthermore, by measuring the difference from an anticipated balance, the dynamic range of the affecting means is reduced, enabling control of a wider range of color differences.

The affecting means may, during the measuring period, be set to a setting corresponding to an anticipated temperature, as in the above aspect. Alternatively, they may be set to a setting within the middle of their range, to enable adjustment in either direction.

In another aspect, the invention provides an electronic video camera in which the image sensor is exposed for a first period and its output is used to control the color balance of a picture derived from the image sensor output in a second exposure period, in which the problem of color temperature being affected by the color of a particular object is solved by providing electrical color signal processing means for reducing the dependence of the image sensor output signal on a single color object, and omitting the optical means such as a de-focussing or a diffuser plate.

Preferably, the electrical processing means is a peak to peak clipping circuit for truncating the value of color signals beyond a predetermined level. Advantageously, the color signals are formed so as to have a substantial degree of independence of brightness, and thus are conveniently formed by subtracting a luminance signal from a color component signal. This reduces the range of the color signal and allows the use of a practical and relatively low clipping threshold.

Providing electrical means for correcting the dependence on single color objects by processing the output of the image sensor thus avoids the necessity for time consuming optical operations such as inserting a diffusion plate, or zooming or defocussing the lens.

Other aspects and preferred embodiments of the invention are as described hereafter or specified in the claims.

BRIEF DESCRIPTION OF THE DRAWINGS

The invention will now be described, by way of example only, with reference to the accompanying drawings in which:

FIG. 7 shows schematically the method of operation of the first embodiment;

FIGS. 10 and 11 show alternative ways of deriving compensation data in the third embodiment.

PRIOR ART

Figure 1:
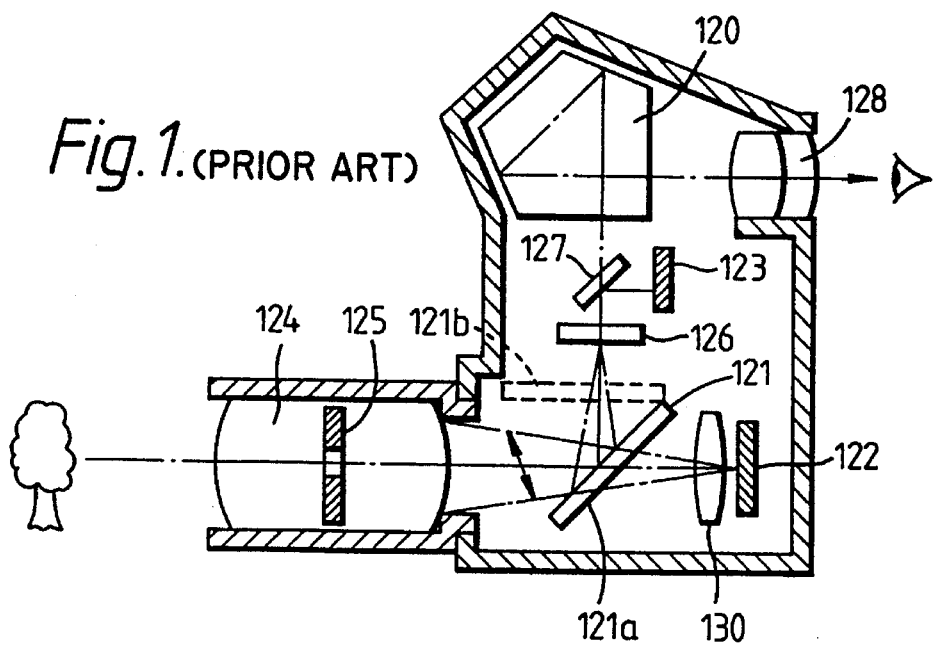
FIG. 1 shows schematically a possible optical arrangement for a camera according to the invention.

FIG. 1 shows, in a sectional view, the mechanical arrangement of an image sensing device embodying this invention. The illustration includes a turnable mirror 121; an image sensor 122 such as a CCD array; and a photometric element 123 such as a silicon photo-cell (SPC) having a corrected spectral luminous efficacy. When the mirror 121 is in a lowered position 121a, the optical path of the device is as follows: A light flux, which has passed though a photo-taking lens 124 and a diaphram aperture 125, is imaged on a focussing glass 126 by the mirror 121. The optical image thus obtained passes through a half-mirror 127, a pentagonal prism 120 and an eye piece 128 to permit visual observation through a view finder part. Meanwhile, a portion of the light flux reflected by the half-mirror 127 reaches the photometric element 123.

When the mirror 121 is in an uplifted position 121b, 100 percent of the light flux, which has passed through the photo-taking lens 124 and the aperture 125, reaches the image sensor 122, if it is not blocked by a shutter 130. The shutter 130 is a focal plane shutter consisting of blades S1 and S2, as will be further described later.

Figure 2:
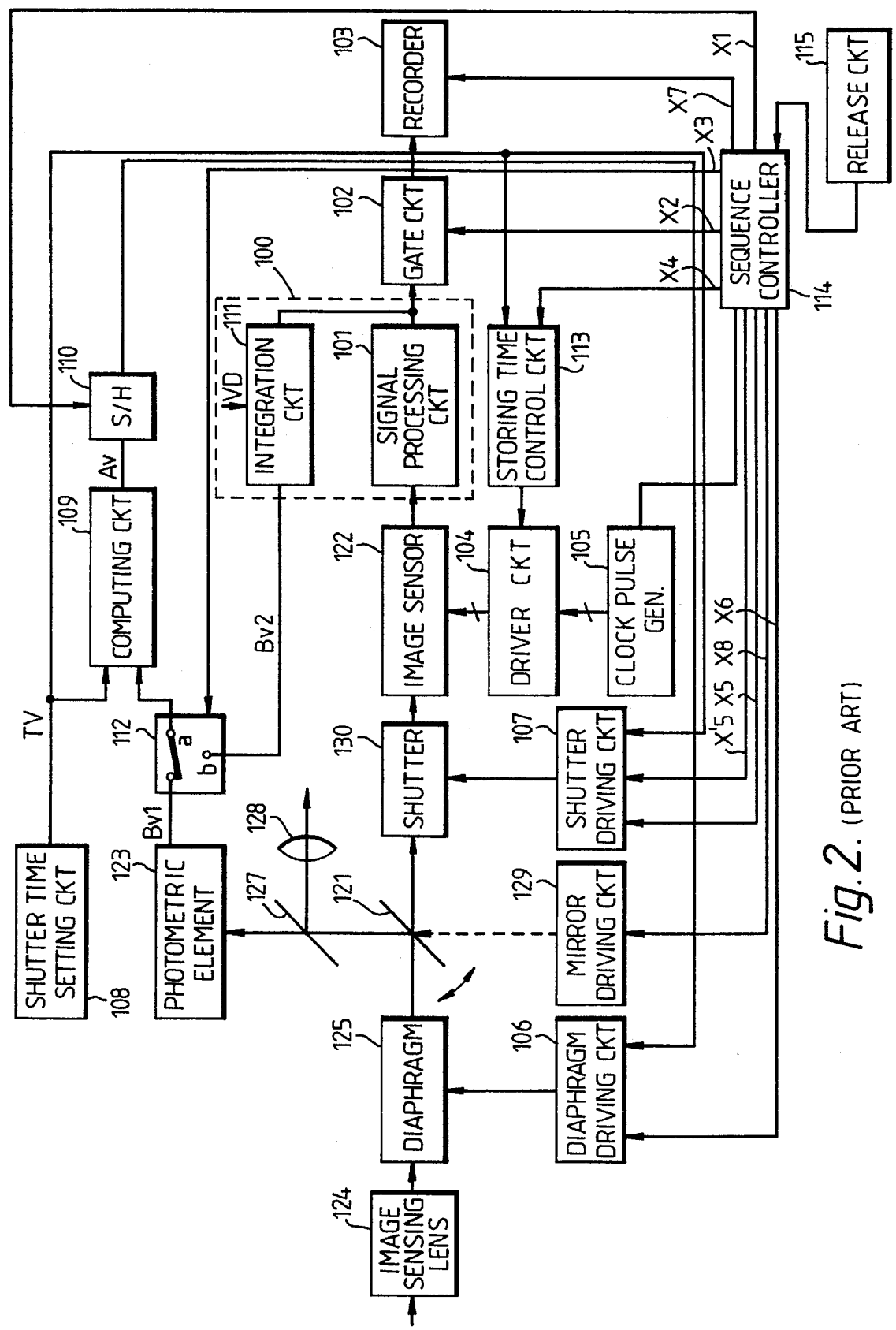
FIG. 2 shows schematically a block diagram showing the electrical connection of the elements of FIG. 1.

FIG. 2 is a block diagram showing, by way of example, the electrical circuit arrangement of the image sensing device embodying this invention. The same reference numerals as those used in FIG. 1 denote the same component elements. A signal processing circuit 101 is arranged to perform various correcting operations on luminance and chrominance components of a signal produced from the image sensor 122. Reference numerals 102 and 103, respectively, denote a gate circuit and a signal recorder for recording the picture. The gate circuit 102 is arranged to have the open period and the operating timing thereof is controlled by a control output X2 of a sequence controller 140. A driver circuit 104 is arranged to drive the image sensor 122. A clock pulse generator 105 is arranged to provide the driver circuit 104 with varied timing signals and also to form a vertical synchronizing signal. A diaphragm driving circuit 106 is arranged to control the operation and the aperture value of the diaphragm in accordance with an output X6 of the sequence controller 114 and the output of a sample-and-hold circuit 110. A shutter driving circuit 107 is arranged to control the operation and exposure time based on outputs X5 and X'5 of the sequence controller 114 and the output of a shutter time setting circuit 108. The shutter driving circuit 107 and the diaphragm driving circuit 106 form exposure control means. The operation of the shutter blades S1 and S2 is under the control of the outputs X5 and X'5 of the sequence controller 114. The shutter time setting circuit 108 consists of a manually operated dial, etc., and is arranged to designate a shutter time value Tv of the shutter 130. A computing circuit 109 is arranged to produce aperture information values Av1 and Av2 by selectively computing the shutter time Tv and luminance information Bv1 produced from the photometric element 123 or an output Bv2 of an integration circuit 111. The sample-and-hold circuit 110 serves as storage means for storing the computation outputs Av1 and Av2 of the computing circuit 109 by sampling them at a timing defined by a control output X1 of the sequence controller 114. The integration circuit 111 is arranged to form exposure control information by integrating, for one vertical period, a luminance signal which is suitably formed by the signal processing circuit 101. A switch circuit 112 is arranged to selectively supply the output Bv1 of the photometric element 123 or the output Bv2 of the integration circuit 110 to the computing circuit 109. When a control output X3 of the sequence controller 114 is at a low level, the switch circuit 120 is connected to one side "a" thereof, and to another side "b" when the output X3 is at a high level. A storing time control circuit 113 is arranged to serve as storing time control means and operates under the control of the sequence controller 114. The storing time of the image sensor 122 is controlled by the control circuit 113 with the pulses which are supplied to the image sensor 122 being controlled based on to the output of the shutter time setting circuit 108.

The sequence controller 114 is arranged to receive the output of a release circuit 115, which forms a release signal and the output of the clock pulse generator 105 which forms a synchronizing signal. The controller 114 produces control outputs X1–X8 which are shown in FIG. 3.

A mirror driving circuit 129 is arranged to control the position of the mirror 121 in accordance with the output X8 of the sequence controller 140.

Figure 3:
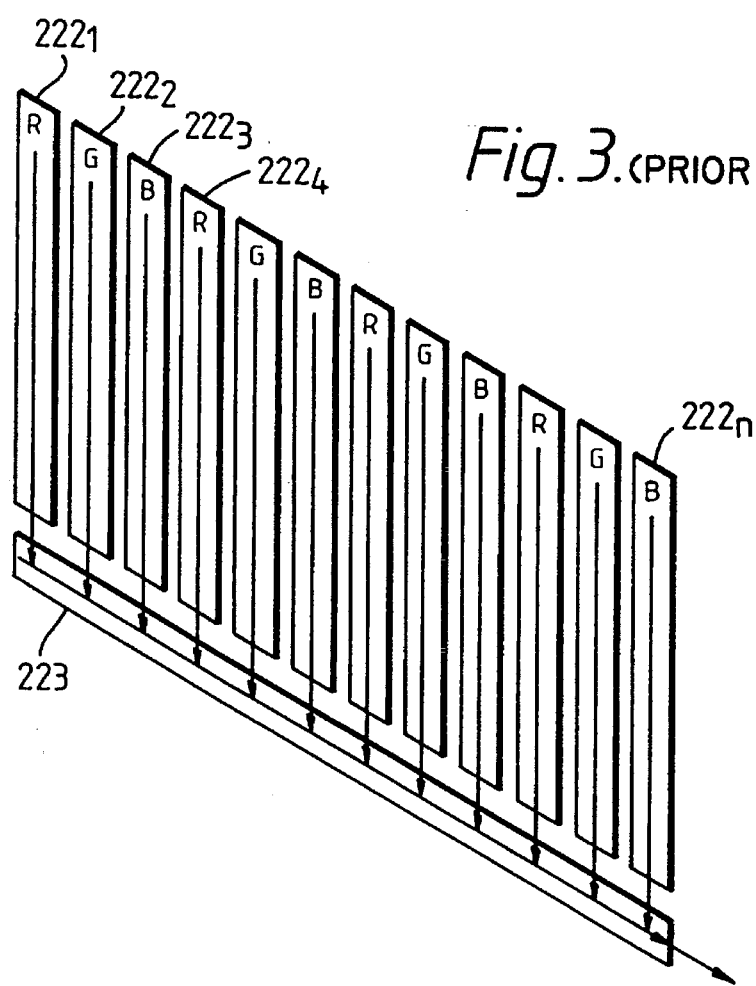
FIG. 3 shows schematically one arrangement of image sensor 22 which may be employed.

Referring to FIG. 3, the sensor comprises a plurality of vertical CCD shift registers $222_1$, $222_2$, $222_3$, $222_4$ ... $222_n$, over each of which is a stripe color filter. The color filters may for example be red (R), green (G), Each vertical shift register $222_1$–$222_n$ is blue (B) filters, arranged so that the stripes run RGB RGB ... Each vertical shift register $222_1$–$222_n$ connected into a cell of a parallel-in-serial-out (PISO) shift registers $222_1$–$222_n$ are clocked down one cell to CCD analogue shift register 223. In use, the vertical bring a line of RGB analogue image pixel samples into the PISO register 223. The PISO register 223 is then clocked to produce a signal comprising a sequence of analogue RGB pixel samples. After the PISO register 223 has been clocked n times (n=the number of vertical shift registers 222), the vertical shift registers $222_1$–$222_n$ are again clocked to bring the next line of pixel samples into the PISO register 223.

The operation of this arrangement will now briefly be described; more information is given in U.S. Pat. No. 4,956,715 (incorporated herein by reference). The diaphragm driving circuit 106 causes the diaphragm to be fully opened. The mirror driving circuit 129 keeps the mirror 121 in the lowered position 121a as shown in FIG. 1. The shutter blades S1 and S2 are initially closed, and the image sensor 122 is consequently in a shielded position.

When the power supply is turned on, the photometric computing circuit 109 begins an initial exposure calculation. The value of the light incident on the photometric element 123 and the set shutter time value from the setting circuit 108 are employed to calculate an approximate exposure value by the computing circuit 109. This value is employed to control the diaphragm driving circuit 106 and hence the diaphragm 125. When a signal is received from the release circuit 115 indicating that a picture is to be taken, the sequence controller 114 operates the shutter driving circuit 107 and mirror driving circuit 129 to open the shutter and move the mirror to expose the image sensor 122. The output of the image sensor 122 is processed by the signal processing circuit 101, and the brightness over the scene is obtained by integrating the processed signal in the integrating circuit 111. The output of the integrating circuit 111 is routed, via the switch 112, to the computing circuit 109 which then adjusts the diaphragm setting value, which is held by the sample and hold circuit 110 the output of which is supplied to the diaphragm driving circuit 106 to control the diaphragm 125.

The shutter 130 and mirror 121 are then closed, shielding the image sensor 122 once more. Next, the shutter 130 and mirror 121 are reopened to re-expose the image sensor 122 during the required shutter time, with the adjusted diaphragm setting. After the shutter time has elapsed, the shutter 130 is once more closed, and the image sensor 122 is read and its output is processed by the signal processing circuit 101, and routed to the recorder 103 where it is stored as a video signal on an appropriate medium (for example a magnetic disk).

Figure 4:
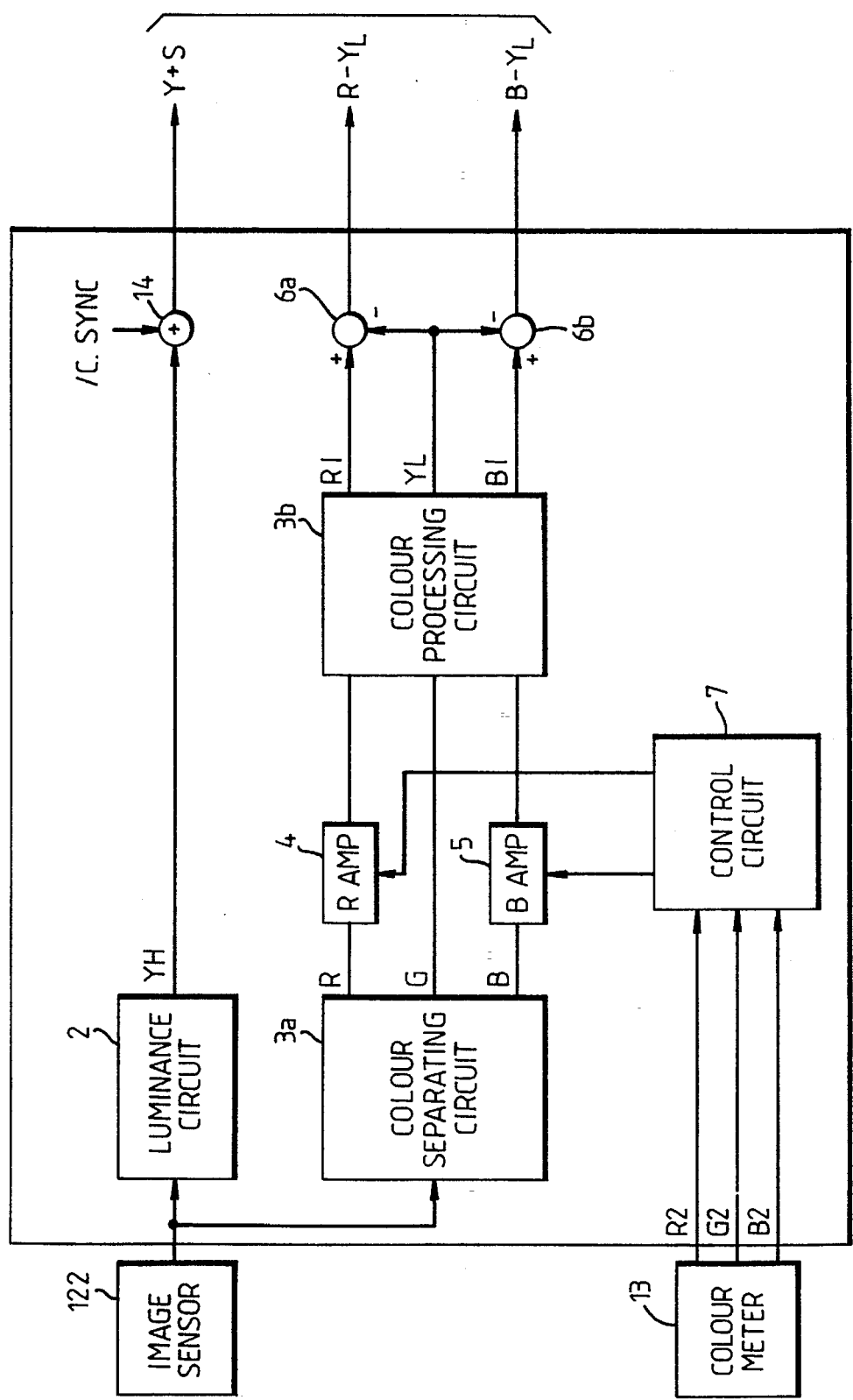
FIG. 4 shows schematically an arrangement of a signal processing circuit including color balance in the prior art.

Referring to FIG. 4, the structure of the signal processing circuit 101 in the prior art is shown in greater detail. The output from the image sensor 122 is passed to a luminance signal processing circuit 2 for processing the output of the image sensor device 1 and producing a luminance signal $Y_H$. The luminance signal $Y_H$ is added to synchronising signals providing, for example, conventional frame and line synchronizing pulses, at an adder circuit 14, to produce a composite (Y+S) luminance video signal.

The output from the image sensor 122 is likewise passed to a color signal separating circuit 3a, which in effect demultiplexes the sequential R, G, B samples into respective red, green, blue channels. The color separation circuit 3a has a generally low pass characteristic, so as to smooth the R, G, B signal samples and consequently eliminate high frequency components thereof. The separated, low pass filtered, color signals are then passed through a color balance adjusting circuit 4,5 comprising a pair of control circuits (e.g. video amplifiers) in two of the color channels. Since it is desired only to control the relative strengths of the three colors, a third gain control circuit is not necessary. The gain control circuits are, for example, controlled amplifiers receiving a digital or analogue control signal. The balanced color signals are then supplied to a further color signal processing circuit 3b which effects conventional video signal processing (typically for example gamma correction) and produces from the separated components a further luminance signal $Y_L$ according to the well known equation. Since the color components from which this luminance signal $Y_L$ were formed do not include high frequency information, the luminance signal $Y_L$ is similarly band limited.

A pair of subtraction nodes 6a, 6b form color difference signals $R_1-Y_L$, $B_1-Y_L$, which are then supplied to the recording means 103 together with the luminance signal $Y_H$ (which includes the high frequency luminance information).

The control signals for controlling the color balancing circuits 4,5 are provided from a control circuit 7 (typically a microprocessor operating under stored program control which may also provide the sequence controller 114 and/or computing circuit 109), which is connected to receive the outputs of a color measuring circuit 13 which comprises three color sensors each comprising a photosensitive element covered by a respective color filter, and producing color outputs $R_2, B_2, G_2$, which are supplied via analogue-to-digital conversion means (not shown) to the operational control circuit 7. The color measuring circuit 13 is typically disposed on the outside of the camera behind a frosted glass diffuser, and consequently its color signal outputs tend to be representative of the color balance of the scene. The control circuit 7 detects imbalances between the color levels, and controls the gain of the circuits 4,5 to effect a compensating gain imbalance in the opposite sense.

FIRST EMBODIMENT

Figure 5:
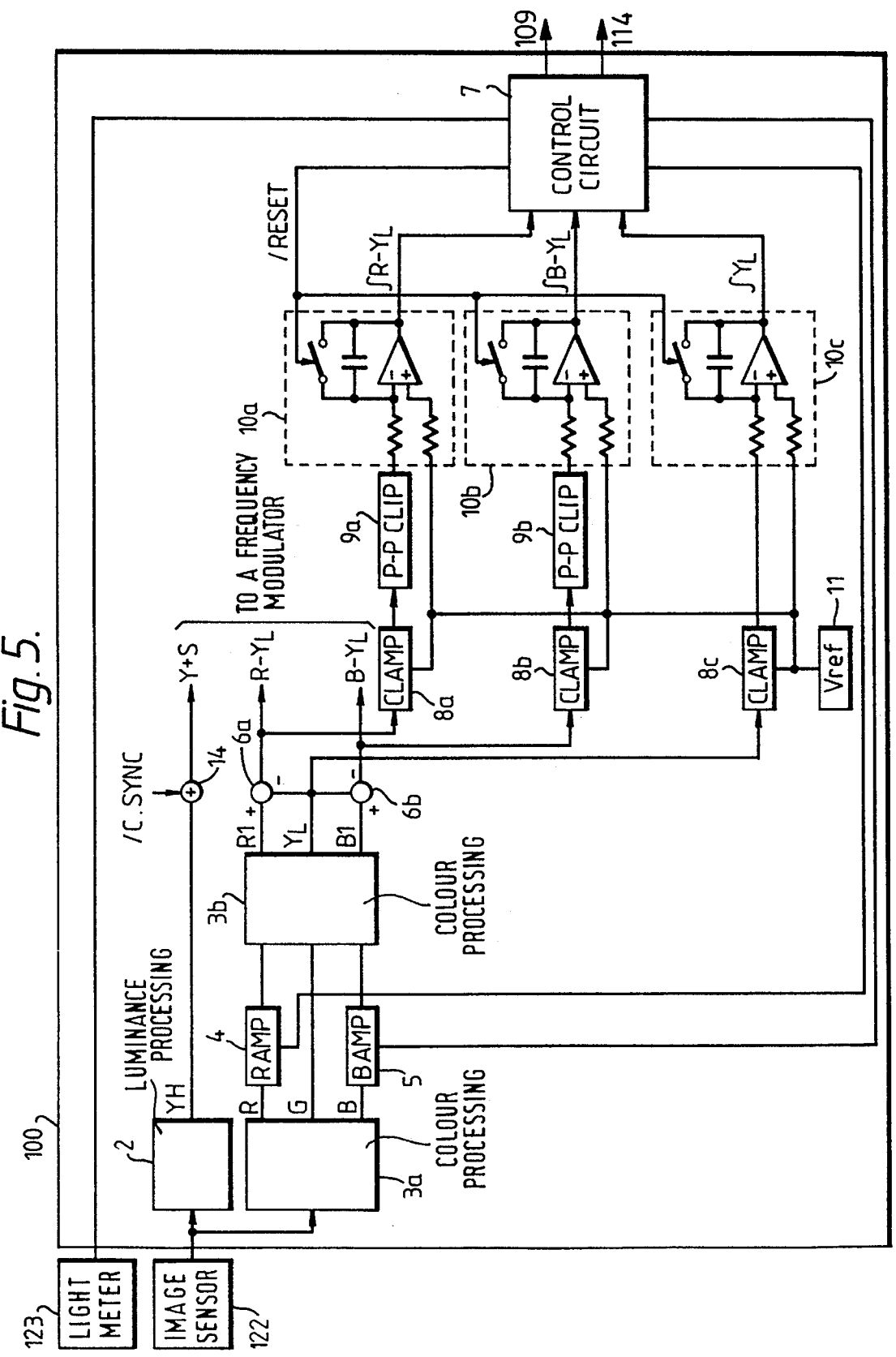
FIG. 5 shows schematically a block diagram of a signal processing circuit including color balancing according to a first embodiment of the invention.

Referring to FIG. 5, in which like parts are denoted by the same numbers as in FIG. 4 and not discussed further, the arrangement of the circuit block 100 comprising the signal processing circuit 101 and integration circuit 111 of FIG. 2 will now be described.

The control circuit 7 in this embodiment may also provide the shutter computing circuit 109 and sequence control circuit 114, which conveniently avoids duplication of control circuits. In this embodiment, the color measuring circuit 13 is dispensed with, thus avoiding the need for a further photoelectric device. The color difference signals $R_1-Y_L$, $B_1-Y_L$ are also supplied to respective color signal averaging circuits 10a,10b. The averaging circuits conveniently each comprise circuits having a generally low pass or integrating characteristic, and are preferably analogue integrators provided, for example, as Miller integrators employing operational amplifiers.

The period over which the integrators integrate is controlled by a /RESET control line from the control circuit 7. The output signals from the integrators 10a, 10b at the end of the integration period are then digitized by analogue-to-digital conversion means and comprised within control circuit 7.

Where the period of integration is over the whole frame reading period of the image sensor 122, the outputs of the integrators 10a,10b therefore represent the average color difference values across the entire frame and it is possible to calculate color balance control values in dependence upon the differences therebetween. The operational control circuit accordingly calculates control values for controlling the color balancing circuit 4,5. A third integrator 10c is provided connected to the low frequency luminance signal $Y_L$ to provide an average luminance value across the frame. The integrator 10c can thus provide the integration circuit 111 of FIG. 2, and the operational control circuit 7 can provide the exposure control computing circuit 109 of FIG. 2 and correspondingly outputs exposure control signals.

In this embodiment, each integrator 10a–10c is preceded by a respective clamp circuit 8a–8c which clamps the DC level of the respective signal to predetermined voltages defined by a reference voltage source 11, to improve the accuracy of the integration operation and reduce drift or offset errors.

In this embodiment, the clamped color signals from the clamp circuits 8a–8b are further processed by respective range clipping circuits 9a–9b which operate to limit the maximum excursions of each individual color signal. This advantageously prevents the color balance control circuits from adjusting the color balance inappropriately to a large degree for example when the camera is pointed at a completely red, green or blue object occupying a substantial part of the field of view.

In this embodiment, the clipping circuits 9a,9b operate on chrominance signals which are responsive to the difference between the color component signals R,B and a measure of the brightness (luminance). This firstly tends to reduce the magnitude of the color signal (at least in the case where the color signal is much brighter than the other two color signals) as when the camera is pointing at a monochrome object, and secondly tends to make the signal more related to the difference in level of the color components. The effect of the clipping circuit 9a or 9b is, as is well known, merely to constrain the value of signal samples lying above or below respective positive and negative thresholds to the value of those thresholds.

Next, the operation of this embodiments is explained by reference to FIGS. 5 to 7.

When a first switch SW1 (not shown) is operated by a user to indicate a desire to take a photograph (step 101 in FIG. 7), a rotation servo control for the magnetic disk recorder 3 is started (step 102) and then the brightness is measured by the photometric element 123 of FIG. 2 (step 103). When a second switch SW2 (not shown) is operated by the user (step 104), the light measuring operation is finished and a constant, predetermined, white balance control signal is output from the operational control circuit 7 to control the color balancing gain circuits 4,5 (step 106).

Figure 6:
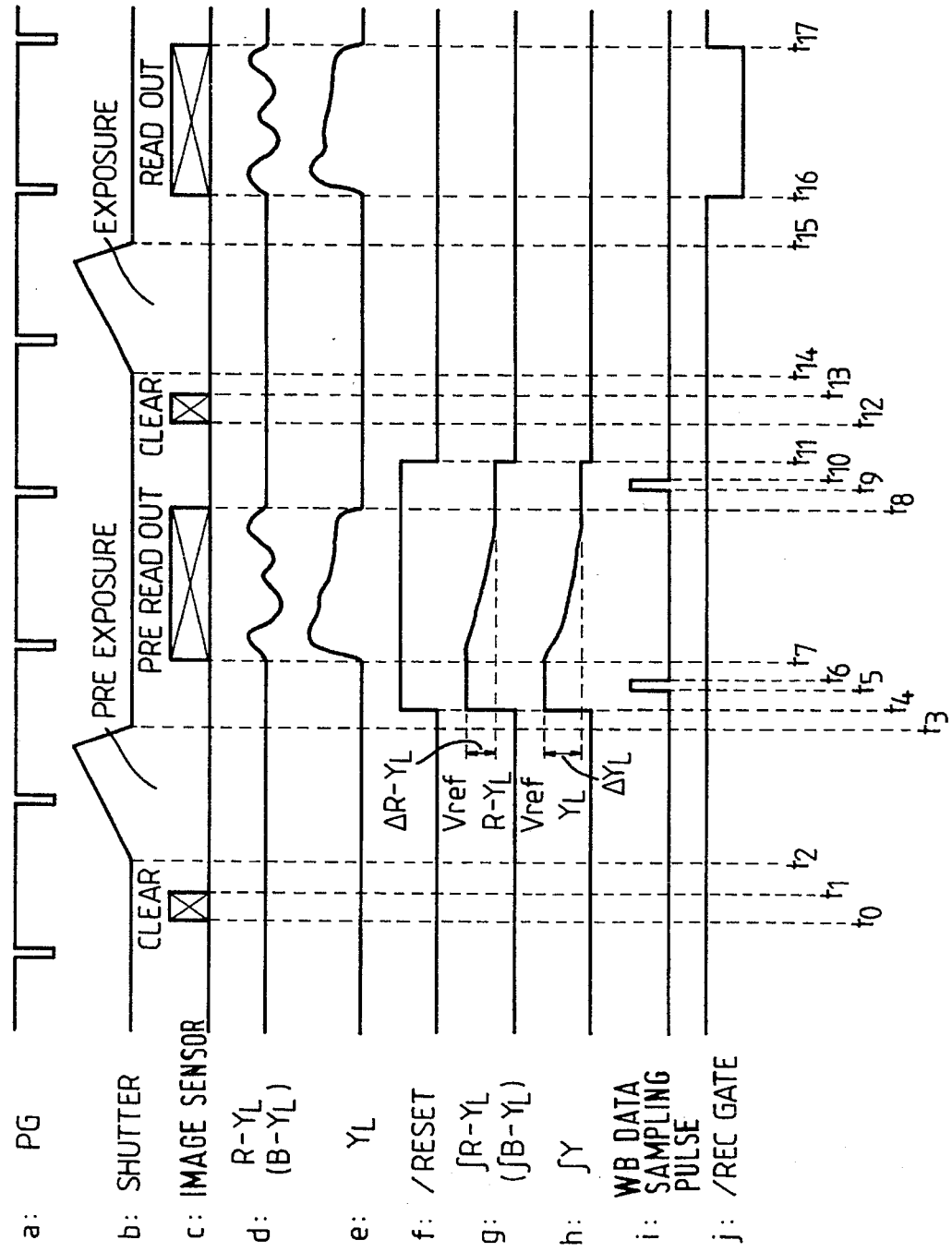
FIG. 6 shows schematically a timing diagram for the first embodiment.

Next, a clearing operation to clear unnecessary charges which may have accumulated in the image sensor device 122 is carried out during a period from $t_0$ to $t_1$ of FIG. 6 (step 107), and then at the time $t_2$, the shutter 130 starts to open for the initial exposure (or pre-exposure) period (step 108). The period for which the shutter is open, and the setting of the diaphragm 125, are determined by the output of the photometric element 123 by the shutter computing circuit/operational control circuit 109 in a light measuring operation denoted EVav.

At the time $t_3$, the initial exposure operation is completed and the shutter is closed. At the time $t_4$ a /RESET pulse is supplied by the control circuit 7 to the integrators 10a–10c to start the integration operation. Then, over the period $t_5$ to $t_6$ the output of the integrators 10a–10c are sampled and measured by the control circuit 7, and stored therein, for reasons discussed later (step 109).

Next, in step 110, the charges stored in the image sensor 122 are read out during $t_7$ to $t_8$. These read-out signals are converted into R, G and B signals as described above and the resulting chrominance (color difference) signals $R_1-Y_L$, $B_1-Y_L$ are integrated by the integrators 10a,10b. Additionally, the luminance signal $Y_L$ is integrated by the integrator 10c.

Preferably, the levels outside which the clip circuits 9a,9b operate are set in dependence upon the anticipated ranges for an anticipated type of light source. The levels may be constant, or a manual switch could be provided with various light source settings ("daylight", "floodlight", etc). Thus, even if the average color exceeds a predetermined range, overcompensation of the wide balance may be prevented.

The read-out of the image sensor ceases at a time $t_8$, and over a time $t_9-t_{10}$ the integrated result signals $\Sigma(R_1-Y_L)$ $\Sigma(B_1-Y_L)$, $\Sigma Y_L$ are read from the output of the integrators 10a–10c by the operational control circuit 7 (step 111). The integration circuits 10a–10c are then reset at time $t_{11}$.

The control circuit 7 then calculates (step 112) the differences between the initial value sample (taken at the step 109) and the integration value sample (taken at the step 111) and employs these difference values as the resultant integration value for the two color difference signals and the luminance signal. The advantage of so doing is that the integration values generally contain noise integration components resulting from the integration of superimposed noise signals from various sources, such as offset errors within the integrators 10a–10c or difference or error voltages between the clamping voltages of the clamp circuits 8a–8c. Other electrical error signals within the circuitry prior to the integrators 10a–10c may also be reduced.

Thus, in this embodiment, these noise signals are reduced by subtracting an initial integration value, taken prior to the readout from the sensor 122, from the integrated signals sampled after the sensor readout period. In other words, firstly the outputs obtained from the color and luminance channels when the image sensor 122 is light shielded are integrated in the integration circuits 10a–10c, the output of which is sampled by the operational control circuit 7 and stored as initial values, and then these initial values are subtracted from integrated sample values obtained after the readout following the pre-exposure operation so as to produce corrected integration values $\Sigma(R-Y_L)'$, $\Sigma(B-Y_L)'$, $\Sigma(Y_L)'$, as step 112 in FIG. 7.

The correction applies to the luminance signal, which may be used to generate an exposure control signal, as well as to the color signals.

The operational control circuit 7 may operate to correct color balance in exactly and the same manner as the prior art circuit shown in FIG. 4, the integration values are processed as follows:

$R_2 = \Sigma(R-Y_L)'/\Sigma(Y_L)'$ $B_2 = \Sigma(B-Y_L)'/\Sigma(Y_L)'$ $G_2 = (1/0.59)((\Sigma Y_L)' - 0.3R_2 - 0.11B_2)$ These figures $R_2$ $G_2$ $B_2$ may therefore be regarded as equivalent to the outputs of the color measuring circuit shown in FIG. 4 and by the use of these, appropriate gain control signals for the balancing circuits 4,5 are obtainable (step 114) by the operational control circuit 7, in a manner described, for example, in JP-A-63-300688 (incorporated herein by reference) and known per se.

After this, as in the recording operation of a conventional electronic still video camera, unnecessary charges accumulated in the image sensor device 122 are cleared (step 115) during the period $t_{12}$ to $t_{13}$ and then during the period $t_{14}$ to $t_{15}$ the shutter 30 is open (step 116) to expose the image sensor device 122 through the diaphragm 25 during the shutter time determined in accordance with the integrated luminance signal, to form a picture.

At a time $t_{16}$ a pulse is generated from the pulse generator to initiate the starting position of a magnetic disk in the recording means 103 (step 117) and, in synchronism with the pulse generator (PG), the charges accumulated in the image sensor 122 are read out, while the gate 102 is opened by a pulse /REC GATE to gate the color difference signals R–$Y_L$, B–$Y_L$ and the composite luminance signal Y+S to the recording means 3 where they are modulated on to a high frequency carrier and recorded on the magnetic carrier. The settings of the color balance circuits 4,5 during the reading out and recording of the video signal are, of course, those which the control circuit 7 has set in dependence upon the outputs of the integrators 10a,10b during the pre-exposure period described above.

SECOND EMBODIMENT

Figure 8:
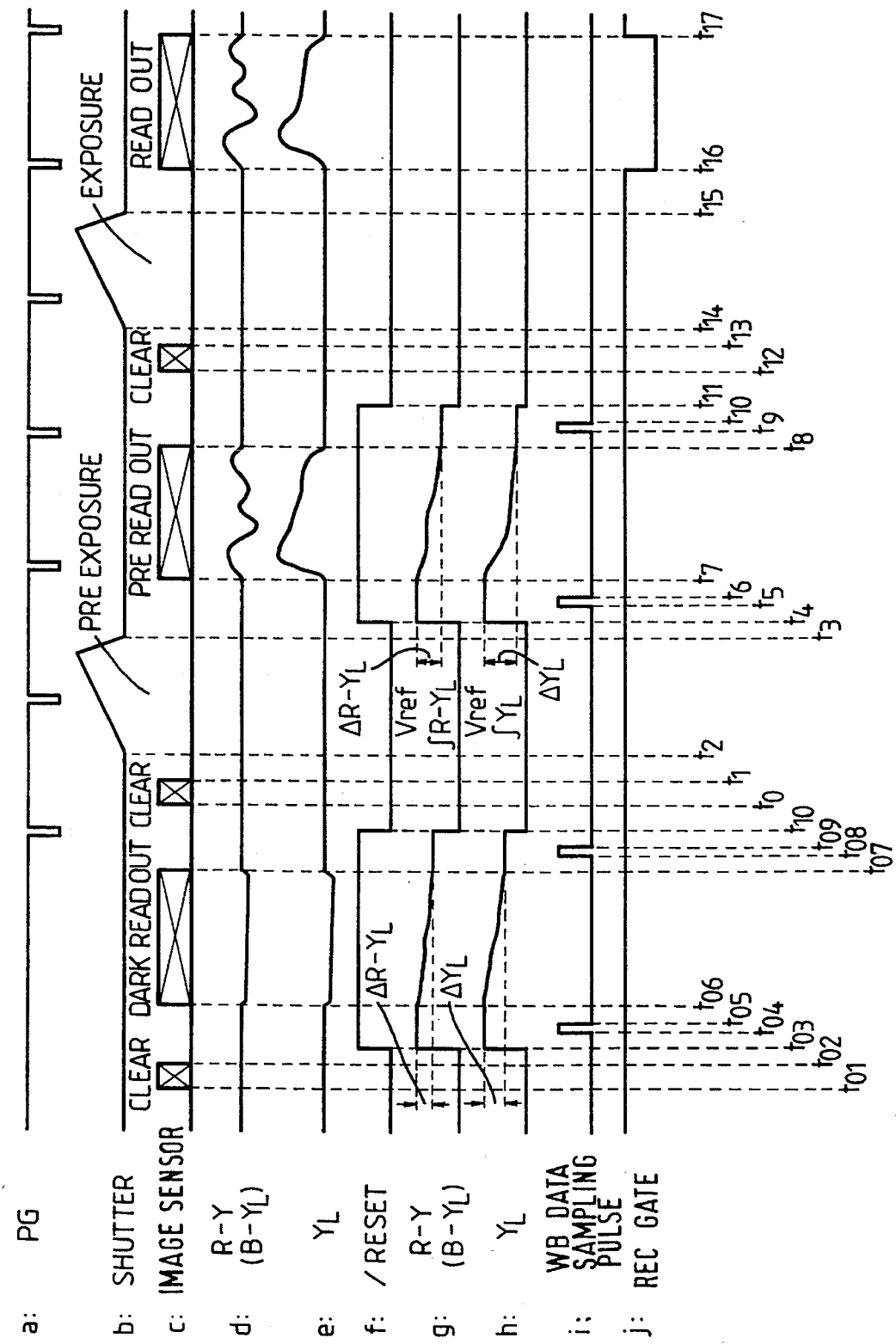
FIG. 8 shows schematically a timing diagram for a second embodiment of the invention.

In the second embodiment, the structure of the apparatus is substantially as in FIG. 5 but the control circuit 7 is arranged or programmed to operate in a slightly different manner, which will be described with reference to FIG. 8. In the second embodiment, the operation is similar to that in the first embodiment except that an additional read out of the image sensor 122 is made while the sensor 123 is shielded from light. Accordingly, firstly, the residual charges in the sensor are cleared during a period $t_{01}$ to $t_{02}$ and then in the period $t_{06}$ to $t_{07}$ the device 122 is read out whilst the integrators 10a–10c are set into the integrating condition by the operational control circuit 7.

The output of the integrators may be sampled at the period $t_{04}$ to $t_{05}$, exactly as discussed above, and this value subtracted from the integrated output sampled at the period $t_{08}$ to $t_{09}$.

In this embodiment, as in the first embodiment, before the picture-taking exposure operation a pre-exposure operation is carried out to obtain integrated color and luminance representative signals for controlling, respectively, color balance and exposure level. However, in this embodiment, further accuracy is obtained by subtracting the stored results of the integration performed while the light sensor 123 was light shielded from the thus obtained integrated color and luminance value samples of the period between $t_{09}$ and $t_{10}$.

This enables particularly good compensation of inaccuracies due to, for example, dark current variations caused by changes of temperature of the image sensor 123. By integrating the dark current output of the image sensor just prior to taking a picture and then subtracting such integrated values from the representative integrated color and luminance values derived during pre-exposure, accuracy is increased.

THIRD EMBODIMENT

Figure 9:
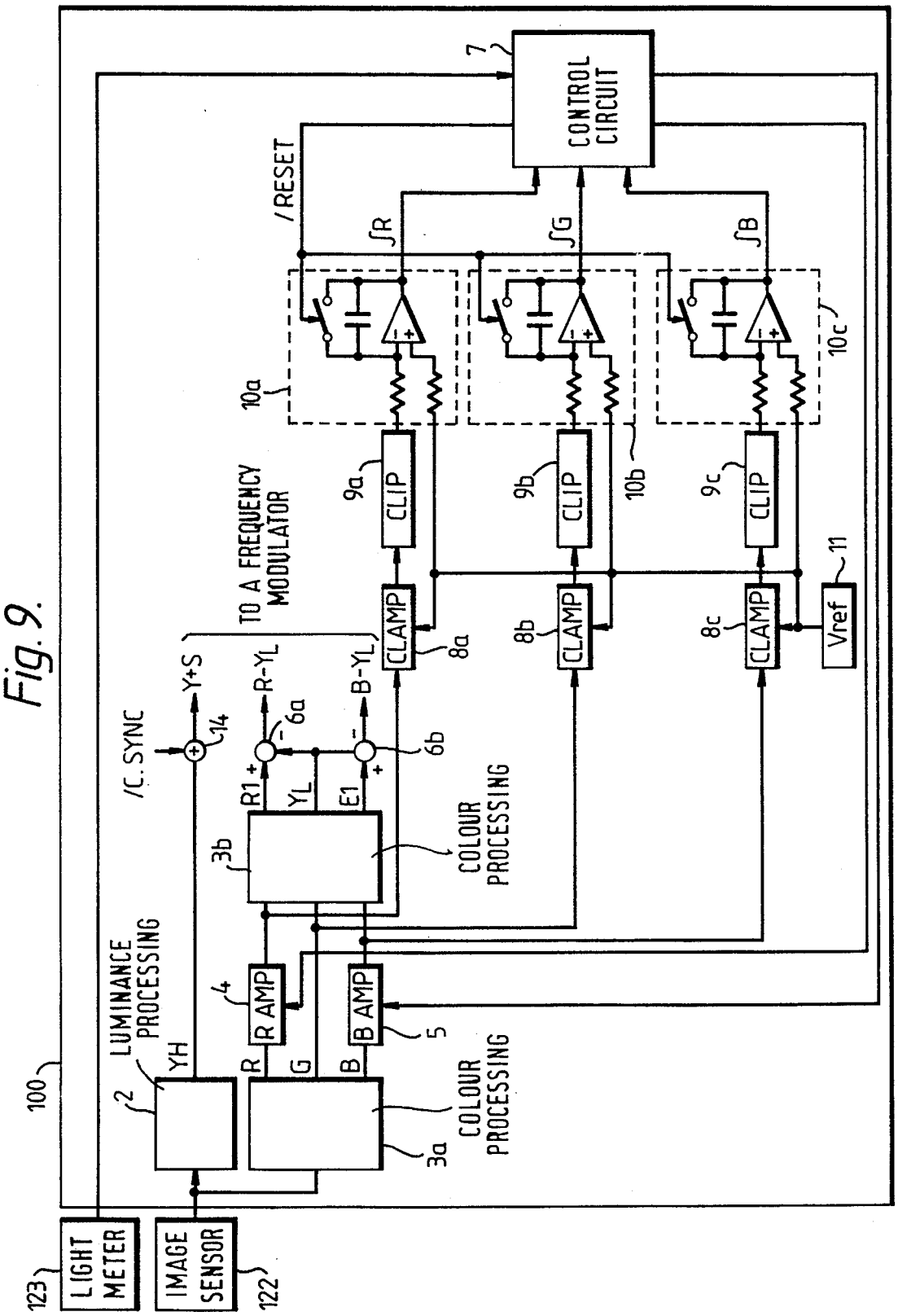
FIG. 9 shows schematically a block diagram of a third embodiment of the invention.

FIG. 9 illustrates a block diagram of a third embodiment of the invention. In FIG. 9, those components with the same numerals as in FIGS. 4 and 5 have corresponding functions, and will not be further referred to.

In this embodiment, the red, green and blue signals (sampled after the color balancing circuits 4,5) are supplied to integrators 10a–10c. As a result, the output samples (which are preferably corrected as in the above embodiments) may be directly employed to calculate balance control signals for the white balance circuits 4,5. In this embodiment, since the integration of the luminance signal $Y_L$ is not necessary for calculating the green components, the separate integration of this signal may be omitted. A corresponding value $Y_L$ may be calculated by setting $Y_L$=0.59 G+0.3 R+0.11 B. This signal may then be used to control the shutter or aperture as discussed above. Alternatively, these may be controlled by other means (not shown).

In this embodiment, the control signals for controlling the gain circuits 4,5 during the pre-exposure operation in which the integrations are obtained, are set preferably around the center of their operating range. This enables correction in either direction.

This arrangement may be characterized as providing a generally feedback type of balance control, where the video amplifiers 4,5 are initially set to the center or some other representative level within their range, and the settings thereof are altered in dependence upon their outputs. This can reduce the range of gains they are required to exhibit, and may also improve stability.

FOURTH EMBODIMENT

The fourth embodiment will be illustrated with reference to FIG. 5. Preferably, when an output from the photometric device 122 is input to the operation control circuit 7, in this embodiment, the aliasing or 'falsing', effects of synchronising to the flicker of the light source such as a fluorescent lamp, for example, are avoided by performing a reading operation at a period which is not a sub multiple of the flicker frequency; for example, for a fluorescent lamp, the reading operation is done 23 times each 50 milliseconds. This reading operation is repeated, and when the switch SW2 is turned on (step 104) a determination of whether or not the light metering is finished is made (step 105). If the light metering is finished (that is, the 23 samples have been finished in 50 milliseconds) predetermined constant white balance control signals are input to the gain control means 4 and 5. These control signals correspond to a predetermined color temperature such as, for example, 5000° K. (step 106). In this embodiment, the color balance data calculation may be performed slightly differently as explained below.

In the step 112 of FIG. 7, the initial values prior to signal read out from the image sensor 123 are subtracted, as in the above embodiments, from the outputs of the integrators 10a–10c after the signal readout as finished, to provide corrected integration values. Then, in step 113, a red/blue ratio is calculated as follows:

$$R/B = (\Sigma Y_L + \Sigma(R-Y_L))/(\Sigma Y_L + \Sigma(B-Y_L))$$

This red/blue ratio is usable as an indicator of the color temperature of a light source and can consequently be used to control the color balancing circuit 4,5. In other words, if the white balance control signals (e.g. voltages) controlling the amplifiers 4 and 5 for the pre-exposure operation in which the integrations were performed, were adequate, the ratio R/B will approximately equal unity but if the ratio R/B is substantially greater than 1 then the white balance is changed to reduce the ratio in subsequent signals, and if the ratio is smaller than 1, then the gains of the amplifiers are changed to increase the ratio.

In other words, the ratios of the amplifier gains are set in inverse dependence upon those of the integrated color signals from the amplifiers.

Next, a method of determining white balance control signals from the ratio R/B will be explained. FIG. 10 illustrates a graph which shows relationships between the ratios and white balance compensation values to be added to or subtracted from the current control signals. In particular, FIG. 10A shows the compensation values for the red amplifier 4 and FIG. 10B shows correspondingly values for the gain of the blue amplifier 5. It will be seen that where the ratio R/B=1, for example, the white balance control data for both amplifiers is 0 indicating that the present level of both amplifiers is to remain unchanged. On the other hand, where the ratio R/B is 1.5, 20 is added to the gain control signal value which controls the red amplifier 4 and 20 is subtracted from the control signal controlling the blue amplifier 5.

Thus, in this embodiment, the white balance control values for the respective color channels depend both on the initial setting of the control values during the pre-exposure operation and on the measured ratio R/B derived from the pre-exposure operation. It will further be noted that preferably the balancing operation is symmetrical, so that an increase in one color component is compensated by a decrease in the other.

The relationship between the control signal value for controlling the amplifiers 4,5 and the red/blue ratio may be calculated by the operation control means 7 using a linear or other equation, in the form illustrated for example in FIG. 10, or alternatively may be provided as a stored look-up table as shown in FIGS. 11A and 11B provided in, for example, a ROM. It will be understood, of course, that whilst in this embodiment compensation has been performed by adding or subtracting the predetermined values, to the preset reference values it may be alternatively performed by multiplying the preset reference values by predetermined ratios to the same effect.

Equally, whilst the ratio R/B is illustrated in this embodiment, for eliminating the influence of green color casts and/or fluorescent lamps, which do not strictly exhibit color temperatures, the ratios R/G or B/G can instead be used to determine the color balance compensation to be performed.

FIGS. 11A and 11B show respectively the relationship between the ratio R/G and B/G to the compensation values to be added to or subtracted from the red amplifier 4 and blue amplifier 5 control signals. It will be seen that the tables comprise essentially two-dimensional look-up tables, so that a pair of measured R/G and B/G ratios specify a unique compensation value for each of the amplifiers 4,5. Compensation data are symmetrically distributed about 0 in the center of the table.

An additional manual operating means (a knob or switch) may be provided in order to adjust the preset white balance control values for the pre-exposure operation, depending on the observed or desired or assumed color temperature (e.g. "indoors", "sunlight"). In this case, the output of the operating means is supplied as an input to the operation control circuit 7.

As mentioned above, in this embodiment, predetermined gain control values are supplied to the white balance control members 4,5 during the pre-exposure operation, and after the pre-exposure operation the signals read out from the image sensor 122 are integrated to generate a color temperature indicator signal (R/B or R/G and B/G, for example), used for compensating the preset values to reduce the last measured color imbalance. Here, the preset control values are selected so as to lie in the center of the white balance control range, to permit a wide range of adjustment in either direction. Furthermore, if the preset white balance control values are adjustable (for example, manually adjustable) by an additional control member, it is advantageous to employ white balance compensation equations or white balance compensation tables as described above in the operation of the operational control circuit 7.

FIFTH EMBODIMENT

In the above second embodiment, it was proposed that by reading out signals from the image sensor which had been kept in the dark (referred to as dark readout or DRO), then by subtracting the values thus formed from integration values formed by integrating the signals readout from the image sensor 123 after a pre-exposure operation in which it is open to light, the offset errors including offsets due to the image sensor 123 can be reduced. However, this method increases the time delay between a user initiating the start of taking a photograph and the actual phototaking exposure. This time delay can reduce the effectiveness of the camera in taking "snap" shots or a rapid sequence of pictures.

In this embodiment, the integration values derived from the dark readout are stored for a predetermined period, and instead of performing a separate dark readout before taking each photograph, the same stored integration values are used each time to correct the results of each pre-exposure operation. For example, the predetermined period may be the period for which the camera is turned on, or may be defined as a fixed period of time in minutes or hours.

Referring to FIGS. 5 and 6, when a power switch SW (not shown) of the camera is turned on, power is supplied to all electrical components of the camera which then start to work. When a metering switch SW1 is operated the photometric cell 123 starts light metering, and sets the initial shutter and/or aperture of the camera to a desired value.

The first time the picture taking switch SW2 is operated, the apparatus performs the first stages $t_{01}$–$t_{10}$ of the dark readout described in the second embodiment above. However, different to that embodiment, the dark readout integration values (comprising the difference in values between the outputs of the integrators 10–10c sampled at $t_{08}$–$t_{09}$ and those sampled $t_{04}$–$t_{05}$) are stored and retained in a memory portion of the control circuit 7 until the end of a predetermined period. The apparatus in this embodiment then continues as discussed above in the second embodiment. However, on the next occasion when the switch SW2 is depressed, the dark readout steps are not performed but instead the apparatus commences operation at $t_0$, not $t_{01}$ in FIG. 6. Instead of deriving dark readout integration values, the above mentioned stored dark integration values are employed and subtracted from the results of the pre-exposure integration.

If the values are to be stored for a predetermined time (for example, a predetermined number of minutes) the operation control circuit 7 may be arranged to test, at each operation of the switch SW2, the time which has elapsed since the dark readout integration values were last stored and, if that time exceeds the predetermined time, may be arranged to perform the steps $t_{01}$–$t_{010}$, and replace the existing stored integration values with those thus derived.

In an alternative embodiment, the dark readout integration values can be stored in volatile memory such as RAM so that they are automatically terminated by switching off the main power of the camera by the power switch SW. Since the camera is not usually switched on for long periods, this alternative method can provide good results and is more simple.

Generally, where the predetermined period is properly set the parameters of the integrators 10a–10c and other circuit elements preceding the integrators will not shift greatly with time and therefore the initial samples taken $t_{04}$–$t_{05}$ will be similar to those taken at $t_{05}$–$t_{06}$. Accordingly, in this embodiment and in the second embodiment above, the stages of sampling the signal $t_{04}$–$t_{05}$ and at $t_{05}$–$t_{06}$ may be omitted entirely, together with corresponding subtraction operations.

OTHER MODIFICATIONS OR EMBODIMENTS

Various modifications and substitutions may be made to the above apparatus, and will be evident to the skilled reader, without departing from the spirit and scope of the invention, which is limited only by the appended claims, but embraces also any alternative structures achieving the effect or advantages of the invention.

Although many of the advantages of the invention apply to still video cameras, the application of aspects of the invention to moving picture video cameras is not excluded.

Other types of correction value to those described above could be employed; for example, predetermined correction values taking account of known sensor characteristics could be permanently stored in the operation control circuit 7 and subtracted from integration values formed for each picture taking operation, instead or as well as the correction values described in the above embodiments. However, it is preferred to employ correction values which are automatically derived at predetermined times during the operation of the apparatus, preferably closing time to picture taking operations, so as to be able to compensate time varying errors such as component drift or temperature induced noise.

Corrections could of course be made by multiplying or dividing by a correction value rather than by subtraction.

Although the above embodiments describe controlling white balance to eliminate white balance errors, the correction values may be controlled in such a way as to alternatively obtain special color or chroma effects or to compensate other aspects of the color reproduction.

Particular examples of color signals which may be integrated have been shown in the above embodiments. However, it will be understood that these are not limiting, and color or color difference signals may be processed in other ways prior to the integration operation.

It will further be understood that, although analogue integration circuits are shown here, other circuits which form an integrated or an average color signal value over the entire frame output of the image sensor may equally be employed.

Although one type of image sensor has been described, it will be understood that other types (such as the frame transfer CCD array type) are also suitable and could easily be substituted.

The various features of the above embodiments may, of cousre, be combined in other subcombinations.

ADVANTAGES OF THE INVENTION

By combining the exposure setting and color balancing operations in a single pre-exposure period, precise control of the camera parameters is obtained without excessive delay in taking the picture. Additionally, in preferred embodiments, the same integration circuit may be employed in both operations, thus reducing complexity and cost.

By subtracting correction values from the integration output, the accuracy of the integration is improved which is particularly effective in removing minor but noticeable color casts from the color balance of the picture taken and hence greatly improving the reproduced quality.

If the correction values are derived at a time close to the picture taking instant, the accuracy of the correction is greater and time varying errors can advantageously be corrected. The correction values may take account of the errors introduced by the integrators. Alternatively, or additionally, they may take account of the integration errors caused by the image sensor. In this latter case, since reading out the image sensor is relatively slow, it is advantageous not to derive the correction before every picture is taken but to employ a single correction for a predetermined time. Advantageously, the time is the time for which the camera is switched on. This is of particular use where a series of photographs are desired to be taken in very quick succession.

In the case where white balance data are derived by integration of the image sensor output in a first exposure operation, the signals integrated are preferably those derived from the output of the balance control means, and these are preferably set to a predetermined white balance control level. Preferably the predetermined level is in the middle of their range. This allows a wide range of balance adjustment.

Alternatively, the predetermined white balance may correspond to a user set level.

The optical diffusing, or defocussing, or zooming, stage of the prior art may be omitted due to the color clipping means, thus reducing complexity, and increasing speed of picture taking.

Many other advantages of the various features and embodiments of the invention will be apparent from the foregoing to the skilled reader.

What is claimed is:

1. Electronic camera apparatus comprising:
   photoelectric conversion means for producing an electrical image signal corresponding to a received image;
   exposing means for exposing said conversion means to the image, the amount of radiation admitted by said exposing means being controllable;
   color adjusting means arranged to electrically alter the balance of different colors in the picture to be taken; and
   control means for controlling said exposing means to operate a first time to provide a first exposure, and for deriving, from the output of the conversion means corresponding to said first exposure, integrated values which are used to correct both an exposure period and the color balance in a subsequent, picture taking exposure, said control means deriving the integrated values by determining a difference between pre-first exposure sample values and post-first exposure sample values, said control means controlling said exposing means to operate a second time to carry out the picture taking exposure.

2. Apparatus according to claim 1, further comprising color sigal generating means connected to an output of said conversion means, for providing a plurality of separate color responsive signals, and means for performing spatial averaging of said color responsive signals to derive at least one color adjusting control signal.

3. Apparatus according to claim 2, wherein said color adjusting means is arranged to provide three primary color output signals.

4. Apparatus according to claim 2, wherein said color adjusting means is arranged to provide a plurality of color difference signals corresponding to predetermined proportions of color components.

5. Apparatus according to claim 4, in which the color signal generating means is arranged to generate a plurality of color difference signals corresponding to the difference between a primary color value and a brightness value.

6. Apparatus according to any one of claims 1 to 5, further comprising means responsive to the output of the conversion means for generating a signal indicative of image brightness, and means for spatially averaging said brightness indicative signal to provide a control signal for controlling said exposing means.

7. Apparatus according to claim 6, wherein said spatial averaging means comprises integrating means arranged to integrate said signal over a predetermined period.

8. Apparatus according to claim 7, further comprising clamping means for controlling the DC level of an input to the integration means.

9. Apparatus according to claim 8, further comprising means for sampling the initial output of said integrating means, and means for subtracting said initial output from a final output of said integrating means.

10. Electronic camera apparatus comprising:

photoelectric conversion means for generating an electrical output image signal corresponding to a received image;

processing means responsive to an output of said conversion means during a first, non-recording exposure period, to derive integrated correction values which are used to correct both an exposure period and color balance during a second, recording exposure period, said processing means deriving the integrated correction values by determining a difference between pre-non-recording exposure sample values and post-non-recording exposure sample values;

exposure means for exposing said conversion means to the received image, said exposure means operating a first time during the first exposure period and a second time during the second exposure period; and correction means for correcting the exposure period and the color balance during the second exposure period.

11. Apparatus according to claim 10, in which the correction means is arranged to derive and store the correction values at predetermined times.

12. Apparatus according to claim 11, in which the correction means is arranged to derive the correction values at each picture-taking operation of the camera.

13. Apparatus according to claim 11, in which the correction means is arranged to derive the correction values and store the correction values for a predetermined time period and to employ the thus-derived correction values for correction of subsequent picture-taking operations within the predetermined time period.

14. Apparatus according to claim 10, in which the correction values reduce error in the output of the conversion means.

15. Apparatus according to claim 12, in which the correction means comprises means for reading the output of the conversion means corresponding to a light-shielded exposure period, and for deriving the correction values therefrom.

16. Apparatus according to any one of claims 10 to 15, wherein said processing means comprises integrating means for integrating a signal derived from the output of the conversion means over a predetermined period of time, the correction values correcting electrical errors introduced by said integration means.

17. Apparatus according to claim 16, further including means for sampling the output of said integrating means prior to said signal integration, to derive correction data used to form said correction values.

18. Apparatus according to claim 17, in which the correction means derives the correction data subsequent to an initial supply of power to a portion of the camera, and stores the correction data thus derived until the supply of power is removed.

19. Apparatus according to claim 18 in which said processing means uses the integrated correction values to derive a color balance signal.

20. Electronic camera apparatus comprising:

photoelectric conversion means for producing an electrical image signal corresponding to a received image;

color balance adjusting means connected to process the output of said photoelectric conversion means to alter the color balance thereof, said color balance adjusting means including color balance adjustment control means arranged to determine the amount of adjustment to be applied by the adjusting means, said color balance adjustment control means comprising means for reading the output of said conversion means during an initial non-recording exposure period, and for deriving from the read output integrated values for correcting an exposure period and a color balance in a subsequent recording exposure period, said color balance adjusting means deriving the integrated values by determining a difference between pre-non-recording exposure period sample values and post-non-recording exposure period sample values; and exposure means for exposing said conversion means, said exposure means operating a first time during the initial exposure period and a second time during the subsequent exposure period.

21. An electronic still video camera apparatus comprising:

an image sensor for outputting an image signal;

electrical signal processing means, coupled to receive an output of said image sensor, for deriving from said image signal, during an initial non-recording exposure period, integrated values for correcting an exposure period and color balance in a subsequent recording exposure period, said electrical signal processing means deriving the integrated values by determining a difference between pre-initial non-recording exposure period sample values and post-initial non-recording exposure period sample values; and exposure means for exposing said image sensor, said exposure means operating a first time during the initial exposure period and a second time during the subsequent exposure period.

22. Apparatus according to claim 21, in which said processing means comprises means for limiting the magnitude of color representative signals.

23. Apparatus according to claim 21 or claim 22, in which said processing means comprises means for forming color component signals and means for processing said color component signals to reduce their dependence upon image brightness.

24. A camera according to claim 23, wherein the reducing means comprise means for subtracting from the color component signals a luminance signal.

25. Apparatus according to claim 23, further comprising a recording means for recording image signals derived during the subsequent exposure period.

* * * * *

UNITED STATES PATENT AND TRADEMARK OFFICE
CERTIFICATE OF CORRECTION

PATENT NO. : 5,473,375  
DATED : December 5, 1995  
INVENTOR(S) : TSUTOMU TAKAYAMA Page 1 of 3

It is certified that error appears in the above-indentified patent and that said Letters Patent is hereby corrected as shown below:

ON THE COVER PAGE

[54] In the TITLE

"INTEGRTED" should read --INTEGRATED--.

[56] References Cited

U.S. PATENT DOCUMENTS

Insert: --4,956,715 11/90 Okine, et al.--.  
"Takai" should read --Takei--.  
"Dkino" should read --Okino--.

FOREIGN PATENT DOCUMENTS

Insert: --0207543 1/87 Europe  
0394018 10/90 Europe--.

COLUMN 1

Line 4, "INTEGRTED" should read --INTEGRATED--.

COLUMN 5

Line 60, "though" should read --through--.

UNITED STATES PATENT AND TRADEMARK OFFICE
CERTIFICATE OF CORRECTION

PATENT NO. : 5,473,375
DATED : December 5, 1995
INVENTOR(S) : TSUTOMU TAKAYAMA

It is certified that error appears in the above-indentified patent and that said Letters Patent is hereby corrected as shown below:

COLUMN 7

Line 3, close up right margin.
Line 4, "Each vertical shift register $222_1$-$222_7$, is" should be deleted.
Line 6, "Each vertical shift register $222_1$-$222_7$, is" should be deleted.
Line 7, "(PISO) shift" should read --(PISO) CCD analogue shift register 223. In use, the vertical shift--.
Line 8, "CCD analogue shift register 223. In use, the" should be deleted; and "vertical" should be deleted.

COLUMN 10

Line 7, "122" should read --123--.

Line 21, "$\Sigma$ ($R_1$ - $Y_L$)" should read --$\Sigma$ ($R_1$ - $Y_L$),--.
Line 57, "FIG. 4," should read --FIG. 4, and--.

COLUMN 12

Line 37, "sub multiple" should read --sub-multiple--.

UNITED STATES PATENT AND TRADEMARK OFFICE
CERTIFICATE OF CORRECTION

PATENT NO. : 5,473,375

DATED : December 5, 1995

INVENTOR(S) : TSUTOMU TAKAYAMA

It is certified that error appears in the above-indentified patent and that said Letters Patent is hereby corrected as shown below:

COLUMN 14

Line 42, "to" should read --from--.

Signed and Sealed this

Eighth Day of October, 1996

Attest:

BRUCE LEHMAN

Attesting Officer

Commissioner of Patents and Trademarks